(12) United States Patent
Sakurada

(10) Patent No.: US 11,718,151 B2
(45) Date of Patent: Aug. 8, 2023

(54) DETERMINATION DEVICE, VEHICLE CONTROL DEVICE, DETERMINATION METHOD AND DETERMINATION PROGRAM

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 16/590,597

(22) Filed: Oct. 2, 2019

(65) Prior Publication Data

US 2020/0156437 A1    May 21, 2020

(30) Foreign Application Priority Data

Nov. 20, 2018   (JP) .................................. 2018-217423

(51) Int. Cl.
*B60H 1/00*    (2006.01)
*G06V 40/16*   (2022.01)

(52) U.S. Cl.
CPC ..... *B60H 1/00742* (2013.01); *B60H 1/00971* (2013.01); *G06V 40/172* (2022.01); *B60H 2001/00733* (2019.05)

(58) Field of Classification Search
CPC ............ B60H 1/00742; B60H 1/00971; B60H 2001/00733; B60H 1/00785; G06K 9/00288; G06K 2209/23; G06K 9/00805; G06K 9/00791; B60R 1/00
See application file for complete search history.

(56) References Cited

U.S. PATENT DOCUMENTS

| 9,409,549 | B2* | 8/2016 | Yopp ....................... B60S 1/023 |
| 10,609,341 | B1* | 3/2020 | Pertsel ................... H04N 7/181 |
| 2016/0200166 | A1* | 7/2016 | Stanek ............... B60H 1/00657 |
| | | | 165/202 |
| 2016/0232423 | A1* | 8/2016 | Zhong ................... G06K 9/4652 |
| 2018/0060676 | A1* | 3/2018 | Hartmann ............. G06V 20/56 |
| 2019/0202373 | A1* | 7/2019 | Kubota ................... G01N 21/78 |
| 2020/0062180 | A1* | 2/2020 | Stein ....................... B60S 1/023 |
| 2021/0309231 | A1* | 10/2021 | Fujita ................. G01C 21/3602 |

FOREIGN PATENT DOCUMENTS

| CN | 108932503 A | * 12/2018 |
| JP | 2016-181061 A | 10/2016 |
| JP | 107209856 A | 9/2017 |
| JP | 2018-514011 A | 5/2018 |

\* cited by examiner

*Primary Examiner* — Aniss Chad
*Assistant Examiner* — Christopher George Fees
(74) *Attorney, Agent, or Firm* — Oblon, McClelland, Maier & Neustadt, L.L.P.

(57) ABSTRACT

A determination device according to an embodiment of the disclosure includes a vehicle extraction unit that determines whether a predetermined attached matter is on a transparent member of a vehicle, based on first image information that is about a periphery of the vehicle and that is picked up through the transparent member by a camera mounted on the vehicle and second image information that is about a periphery of another vehicle surrounding the vehicle and that is picked up by a camera mounted on the other vehicle.

10 Claims, 5 Drawing Sheets

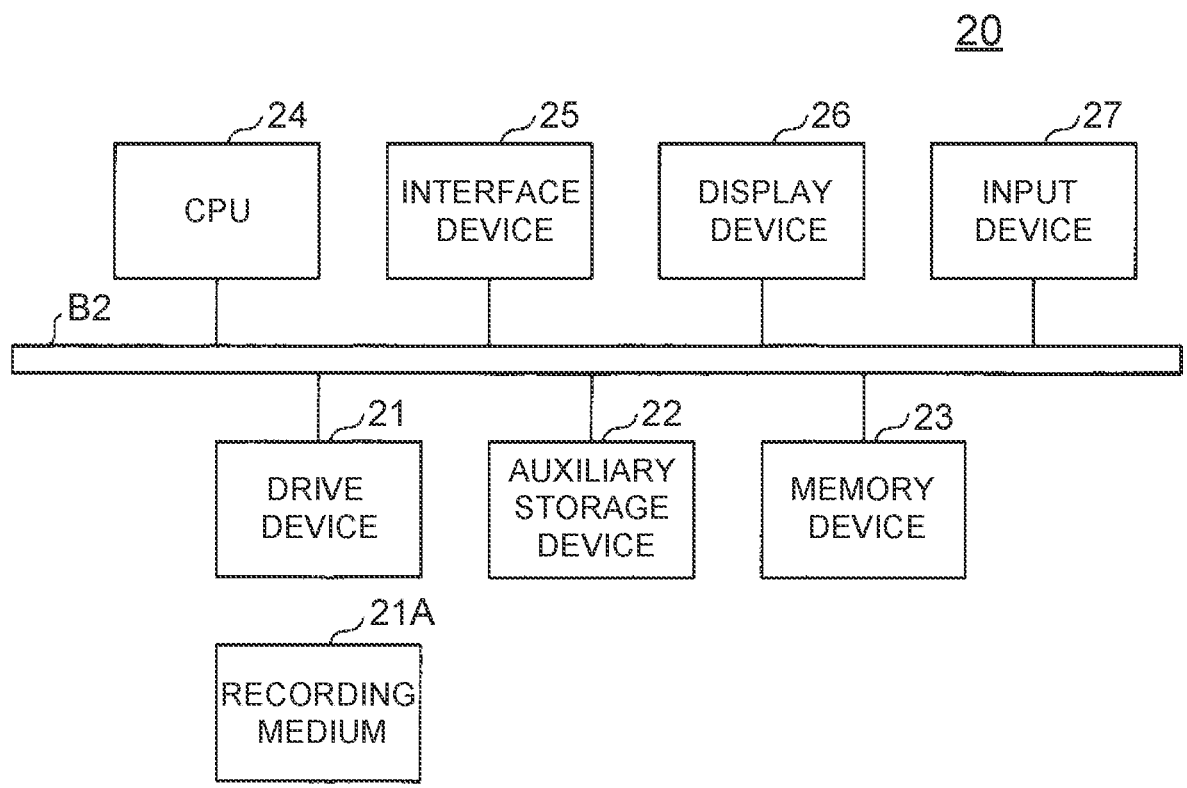

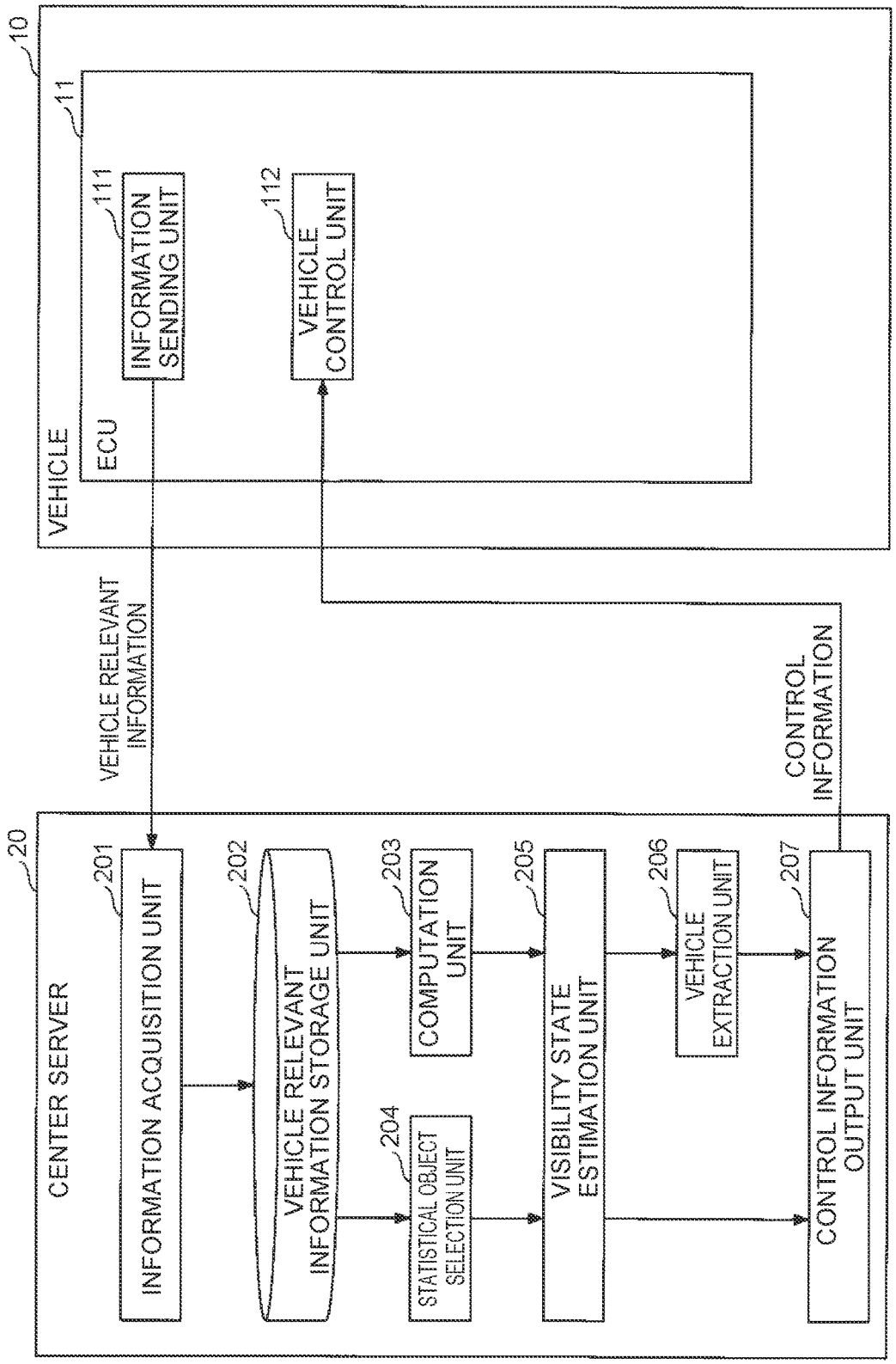

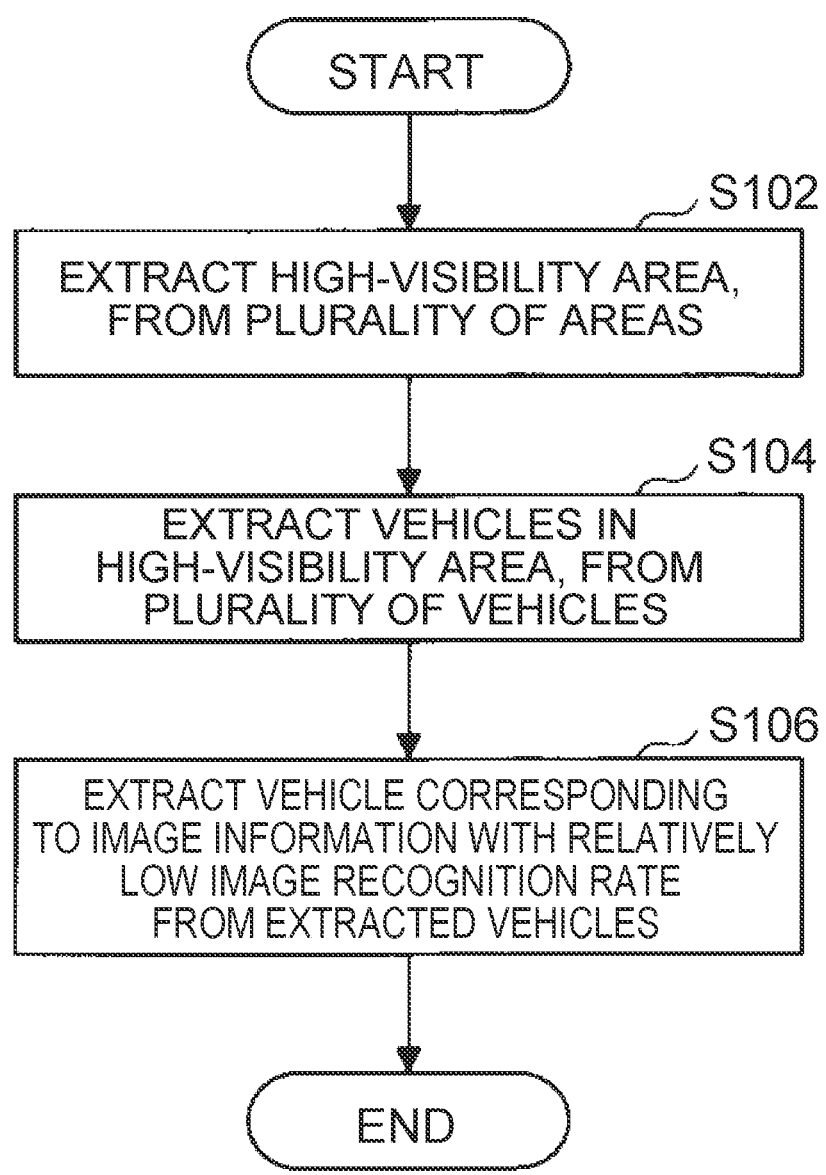

DETERMINATION DEVICE, VEHICLE CONTROL DEVICE, DETERMINATION METHOD AND DETERMINATION PROGRAM

INCORPORATION BY REFERENCE

The disclosure of Japanese Patent Application No. 2018-217423 filed on Nov. 20, 2018 including the specification, drawings and abstract is incorporated herein by reference in its entirety.

BACKGROUND

1. Technical Field

The disclosure relates to a determination device and the like.

2. Description of Related Art

For example, there is known a technology of grasping the level of low visibility using a pickup image of the periphery of a vehicle, which is an image picked up on the vehicle (see Japanese Patent Application Publication No. 2016-181061, for example).

SUMMARY

However, pickup means of the vehicle, as exemplified by a camera, sometimes picks up the periphery of the vehicle, from the interior of a vehicle cabin, through a window, and for example, attached matter on the window, as exemplified by dew and frost, can be taken in picked image information. Further, also in the case where the pickup means of the vehicle is provided in the exterior of the vehicle cabin, raindrop, dirt or the like can attach to a lens part, a transparent member for protecting the lens part, or the like, and the attached matter can be taken in picked image information. Therefore, due to the dew on the window, the raindrop on the lens part, or the like, there is a possibility that even when the visibility of the periphery of the vehicle is relatively high, the situation of the periphery of the vehicle is not appropriately reflected in the image information and it is determined that the visibility of the periphery of the vehicle is relatively low. That is, there is a possibility that it is impossible to distinguish between a state where the visibility of the periphery of the vehicle is relatively low and a state where the attached matter is on the window or the like of the vehicle, even in the case of using the image information that is about the periphery of the vehicle and that is picked up on the vehicle.

Hence, in view of the above problem, an object of the disclosure is provide a determination device and the like that make it possible to distinguish between the state where the visibility of the periphery of the vehicle is relatively low and the state where the attached matter is on a transparent member such as the window or the like of the vehicle, using the image information that is about the periphery of the vehicle and that is picked up on the vehicle.

For achieving the above object, an embodiment of the disclosure provides a determination device including a determination unit that determines whether a predetermined attached matter is on a predetermined transparent member, based on first image information about a periphery of a vehicle and other information relevant to a visibility state of the periphery of the vehicle, the first image information being picked up through the transparent member by a first pickup device that is mounted on the vehicle, the other information being different from the first image information.

With the embodiment, it is possible to use not only the first image information that is about the periphery of the targeted vehicle and that is acquired on the vehicle but also the other information relevant to the visibility state of the periphery of the vehicle. Therefore, even when it is not possible to recognize a physical object in the periphery of the vehicle from the first image information of the vehicle due to the attached matter (for example, dew or frost) on the transparent member (for example, a window), so that the first image information corresponds to a state where the visibility is relatively low, it is possible to determine that the attached matter is on the transparent member, if the other information indicates that the visibility is relatively high. Accordingly, the determination device can distinguish between a state where the visibility of the periphery of the vehicle is relatively low and a state where the attached matter is on the transparent member such as the window of the vehicle.

In the above-described embodiment, the determination unit may determine that the predetermined attached matter is on the transparent member, when a degree of visibility of the periphery of the vehicle that is indicated by the first image information is above a predetermined standard, the predetermined standard being lower than a degree of the visibility of the periphery of the vehicle that is indicated by the other information.

With the embodiment, the determination device can grasp whether the degree of the visibility corresponding to the first image information reflects an actual visibility state, using the degree of the visibility corresponding to the other information as a standard. Accordingly, the determination device, specifically, can distinguish between the state where the visibility of the periphery of the vehicle is relatively low and the state where the attached matter is on the transparent member of the vehicle.

In the above-described embodiment, the other information may be second image information about a periphery of another vehicle surrounding the vehicle, the second image information being picked up by a second pickup device that is mounted on the other vehicle.

With the embodiment, the determination device can use the second image information that is picked up on another vehicle surrounding the vehicle (for example, another vehicle in a 500-meter square area containing the geographical position of the vehicle). Therefore, for example, in the case where the first image information corresponding to the vehicle indicates a relatively low visibility state and where the second image information indicates a relatively high visibility state, the determination device can determine that the attached matter such as dew is on the transparent member such as the window of the vehicle. Accordingly, the determination device can distinguish between the state where the visibility of the periphery of the vehicle is relatively low and the state where the attached matter is on the transparent member such as the window of the vehicle.

In the above-described embodiment, the determination unit may determine that the predetermined attached matter is on the transparent member, when an image recognition rate relevant to the first image information is above a predetermined standard, the predetermined standard being lower than an image recognition rate relevant to the second image information.

With the embodiment, the determination device, specifically, can distinguish between the state where the visibility of the periphery of the vehicle is relatively low and the state where the attached matter is on the transparent member such as the window of the vehicle, based on comparison in the image recognition rate for recognition of a predetermined physical object between the first image information and the second image information.

In the above-described embodiment, the determination unit may determine whether the predetermined attached matter is on the transparent member, based on the first image information and information relevant to a visibility state in a predetermined area containing a geographical position of the vehicle, the visibility state in the predetermined area being estimated from the second image information corresponding to each of a plurality of other vehicles in the predetermined area.

For example, there is a possibility that the visibility state of the periphery is not reflected in the second image information about one of other vehicles similarly to the case of the first image information. With the embodiment, the determination device can use the information that is relevant to the visibility state and that is estimated from the second image information corresponding to the plurality of other vehicles. Therefore, in the information relevant to the visibility state, influence of some second image information not reflecting the visibility state of the periphery is removed, or averaging is performed, so that a higher accurate estimation result for the visibility state is provided. Accordingly, the determination device can more accurately distinguish between the state where the visibility of the periphery of the vehicle is relatively low and the state where the attached matter may exist on the transparent member such as the window of the vehicle.

In the above-described embodiment, there may be provided a vehicle control device including a control information output unit that outputs control information relevant to the vehicle, based on a determination result of the determination device, in which: the transparent member is a window that is provided on the vehicle such that an occupant is able to visually recognize an exterior of a vehicle cabin from an interior of the vehicle cabin; and when the determination device determines that dew or frost as the predetermined attached matter is on the window, the control information output unit outputs at least one of the control information for giving a notice urging the occupant of the vehicle to perform an operation for causing an air conditioner of the vehicle to perform a predetermined action through a notification device of the vehicle and the control information for causing the air conditioner to perform the predetermined action.

With the embodiment, when the determination device determines that dew, frost or the like is on the window, the vehicle control device, specifically, can urge the occupant of the vehicle to perform a manual operation of the air conditioner for removing the dew, the frost or the like on the window, through the notification device of the vehicle. Further, when the determination device determines that dew, frost or the like is on the window, the vehicle control device, specifically, can automatically remove the dew, the frost or the like on the window, by controlling the air conditioner of the vehicle, for example, by executing a defogger function of the air conditioner.

Other embodiments of the disclosure can be realized as a determination method and a determination program.

With the above-described embodiments, it is possible to provide a determination device and the like that make it possible to distinguish between the state of a low visibility of the periphery of the vehicle and the state where the attached matter may exist on the window or the like of the vehicle, using a pickup image that is an image of the periphery of the vehicle and that is picked up on the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2B is a diagram showing an exemplary hardware configuration of a center server;

FIG. 3 is a diagram showing an exemplary functional configuration of the visibility state estimation system; and FIG. 4 is a flowchart schematically showing an exemplary process by a vehicle extraction unit.

DETAILED DESCRIPTION OF EMBODIMENTS

Hereinafter, an embodiment for carrying out the disclosure will be described with reference to the drawings.

Outline of Visibility State Estimation System

Figure 1:
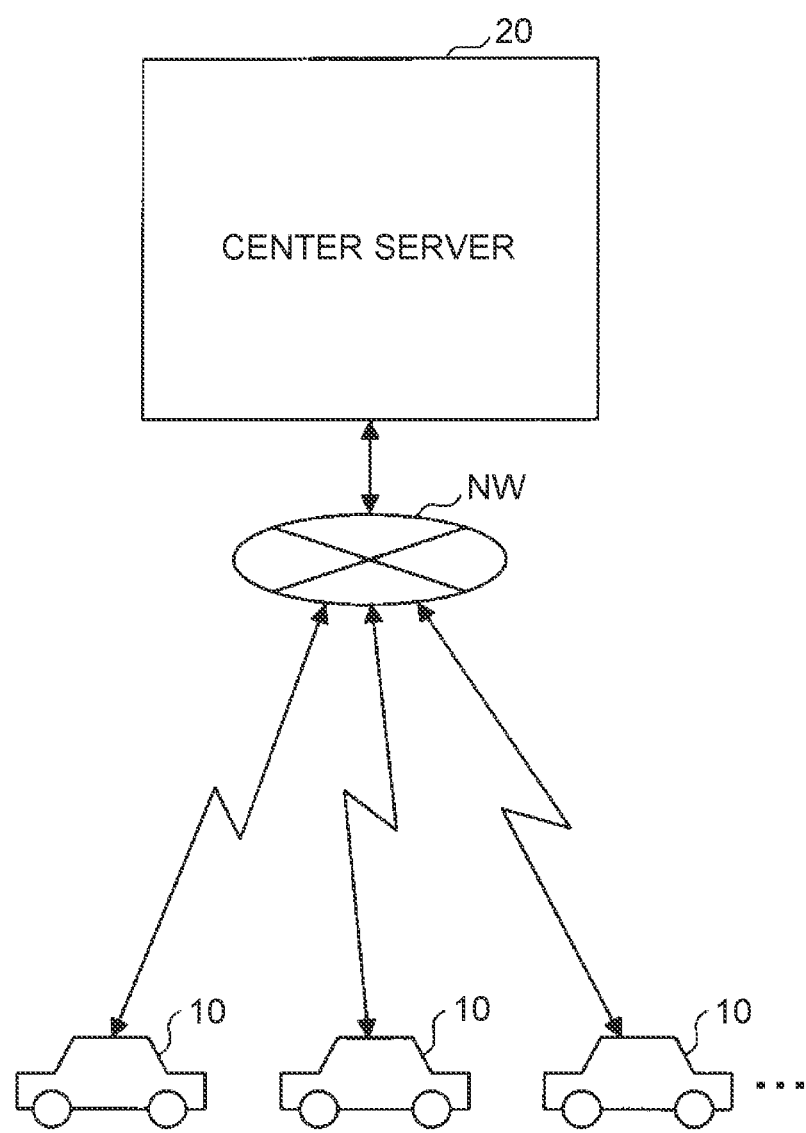
FIG. 1 is a schematic view showing an exemplary configuration of a visibility state estimation system.

First, an outline of a visibility state estimation system 1 according to the embodiment will be described with reference to FIG. 1.

The visibility state estimation system 1 includes a plurality of vehicles 10 and a center server 20.

In the visibility state estimation system 1, the center server 20 estimates a visibility state in an area, for each of a plurality of previously decided areas, based on information relevant to the visibility state of the periphery of a vehicle (hereinafter, referred to as "visibility state relevant information"). The visibility state relevant information is acquired by the plurality of vehicles 10. The plurality of areas may be a plurality of rectangular areas formed by comparting an object area (hereinafter, referred to as an "estimation object area") for which the visibility is estimated by the visibility state estimation system 1, for example, in a pattern of a grid with 500-meter squares. The estimation object area may be arbitrarily set, and for example, may be set to a region across a plurality of countries, the whole of one country, one local region across a plurality of prefectures or a plurality of states in one country, one prefecture, one state, or one district, town or village.

The vehicle 10 is communicably connected with the center server 20, for example, through a communication network NW such as a mobile communication network that uses base stations as terminals, a satellite communication network that uses overhead communication satellites, and an internet network. The vehicle 10 uploads (sends) information (hereinafter, referred to as "vehicle relevant information") that is relevant to the vehicle 10 and that is configured by previously decided kinds of information, to the center server 20, in response to a command from the center server 20 or automatically at a previously decided timing. For example, the vehicle relevant information includes information (hereinafter, referred to as "vehicle state information") relevant to various states of the vehicle 10, as exemplified by a position state, a motion state, a driver operation state and a control state of the vehicle 10. Further, for example, the vehicle relevant information includes information (hereinafter, referred to as "environmental state relevant information") relevant to an environmental state of the periphery of the vehicle 10, as exemplified by the ambient temperature of the periphery of the vehicle 10. The visibility state relevant information is an example of the environmental state relevant information, and is included in the vehicle relevant information.

The center server 20 (an exemplary determination device or vehicle control device) is communicably connected with each of the plurality of vehicles 10, through the communication network NW. The center server 20 receives the vehicle relevant information that is sent from each of the plurality of vehicles 10, and estimates the visibility state for each of a plurality of areas in the estimation object area, based on the vehicle relevant information, as described above. Further, the center server 20 performs various processes, using the visibility state for each of the plurality of areas as the estimation result. Details will be described later.

Configuration of Visibility State Estimation System

Next, a configuration of the visibility state estimation system will be described with reference to FIG. 2A, FIG. 2B and FIG. 3, in addition to FIG. 1.

Figure 2A:
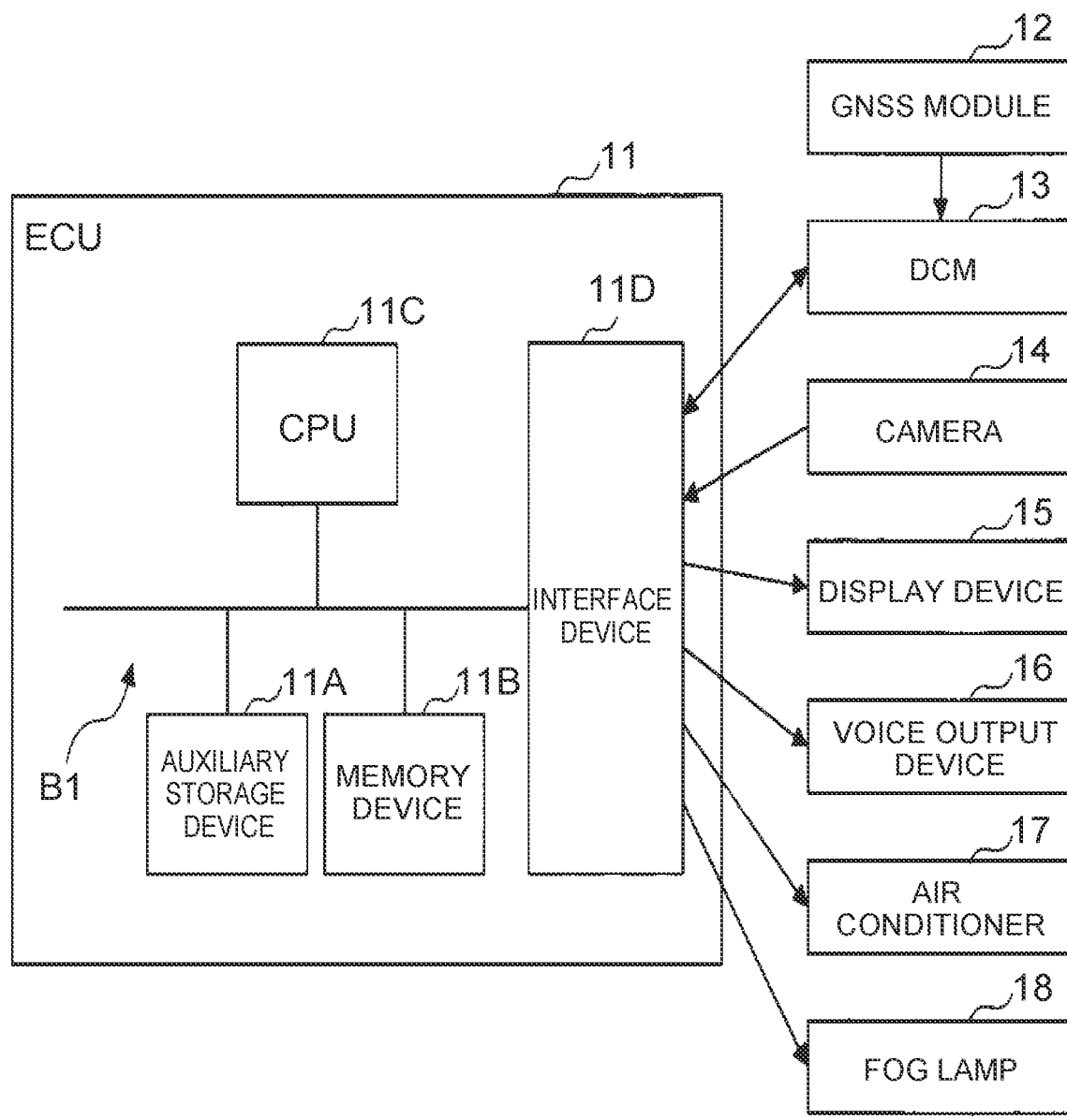
FIG. 2A is a diagram showing an exemplary hardware configuration of a vehicle.

FIG. 2A and FIG. 2B are diagrams showing an exemplary hardware configuration of the visibility state estimation system 1. Specifically, FIG. 2A is a diagram showing an exemplary hardware configuration of the vehicle 10, and FIG. 2B is a diagram showing an exemplary hardware configuration of the center server 20. FIG. 3 is a diagram showing an exemplary functional configuration of the visibility state estimation system 1.

Configuration of Vehicle

As shown in FIG. 2A and FIG. 2B, the vehicle 10 includes an electronic control unit (ECU) 11, a global navigation satellite system (GNSS) module 12, a data communication module (DCM) 13, a camera 14, a display device 15, a voice output device 16, an air conditioner 17, and a fog lamp 18.

The ECU 11 is an electronic control unit that performs controls relevant to various functions of the vehicle 10. The functions of the ECU 11 may be realized by arbitrary hardware or combinations of hardware and software. For example, the ECU 11 may be constituted mainly by a microcomputer including an auxiliary storage device 11A, a memory device 11B, a central processing unit (CPU) 11C, an interface device 11D, and the like, which are connected with each other by a bus B1.

Programs for realizing various functions of the ECU 11 are provided by a dedicated tool to be connected from the exterior through a cable with a predetermined connector (for example, a data link coupler (DLC)) that is connected with an in-vehicle network of the vehicle 10, as exemplified by a controller area network (CAN). In response to predetermined operations in the dedicated tool, the programs are installed in the auxiliary storage device 11A of the ECU 11 from the dedicated tool through the cable, the connector and the in-vehicle network. Further, the programs may be downloaded from another computer (for example, the center server 20) through the communication network NW, and may be installed in the auxiliary storage device 11A.

The auxiliary storage device 11A contains the installed programs, and contains necessary files, necessary data and the like. For example, the auxiliary storage device 11A is a hard disk drive (HDD), a flash memory and the like.

When the memory device 11B receives an activation instruction for a program, the memory device 11B reads the program from the auxiliary storage device 11A and contains the program.

The CPU 11C executes the programs stored in the memory device 11B, and realizes various functions of the ECU 11 in accordance with the programs.

The interface device 11D is used, for example, as an interface for connection with the in-vehicle network and one-to-one connection with various sensors, various actuators and the like. The interface device 11D may include different kinds of interface devices, depending on objects to be connected.

The GNSS module 12 receives satellite signals sent from three or more satellites, preferably, four or more satellites over the vehicle 10, and thereby, measures the position of the vehicle 10 (own vehicle) on which the GNSS module 12 is mounted. Positioning information of the GNSS module 12, that is, positional information about the vehicle 10 is taken in the DCM 13, through a one-to-one communication line or the in-vehicle network, for example. The positioning information of the GNSS module 12 may be taken in the ECU 11 through the in-vehicle network or the like, for example.

The DCM 13, which is connected with the communication network NW, is an exemplary communication device for communicating with an external device including the center server 20 through the communication network NW. The DCM 13 sends and receives various signals (for example, information signals, control signals and the like) for/from the center server 20. For example, the DCM 13 is communicably connected with the ECU 11 through the in-vehicle network. In response to requests from the ECU 11, the DCM 13 sends various signals to the exterior, and outputs signals received from the exterior, to the ECU 11 through the in-vehicle network.

For example, the camera 14 is attached to a front header in the vehicle cabin of the vehicle 10, near the center of the front header, and picks up a forward view of the vehicle 10 from the interior of the vehicle cabin through a front window. The front window is provided on the vehicle 10 such that an occupant can visually recognize the exterior of the vehicle cabin from the interior of the vehicle cabin, and thereby, the camera 14 can pick up an image of the periphery of the vehicle 10 from the interior of the vehicle cabin. Further, the camera 14 may be attached to the vehicle 10, so as to pick up a peripheral view other than the forward view of the vehicle 10, as exemplified by a lateral view or rearward view of the vehicle 10, through a window (for example, a side window or a rear window) other than the front window. The camera 14 picks up the forward view of the vehicle 10 in a predetermined pickup cycle (for example, 1/30 seconds), in a period from activation of the vehicle 10 to stop of the vehicle 10.

The camera 14 may be attached in the exterior of the vehicle cabin. In this case, the camera 14 may pick up the forward view of the vehicle 10 through a predetermined transparent member (for example, a resin plate) for protecting a lens and the like. The activation of the vehicle 10 means that the vehicle 10 transitions from a state not allowing traveling of the vehicle 10 to a state allowing the traveling, and the stop of the vehicle 10 means that the vehicle 10 transitions from the state allowing the traveling to the state not allowing the traveling. For example, in the case where the vehicle 10 uses only an engine as a dynamic power source, the activation and stop of the vehicle 10 include engine start and engine stop, respectively, and in the case where the vehicle 10 is driven by an electric motor, the activation and stop of the vehicle 10 include start of electricity supply from a high-voltage battery as an electric power source for driving the vehicle 10 to the electric motor, and stop of the electric supply, respectively.

The display device 15 (an exemplary notification device) is provided in the vehicle cabin of the vehicle 10, and displays various information image relevant to the vehicle 10. For example, the display device 15 is a display disposed at a nearly central portion (that is, a center cluster) of an instrument panel that is provided at a front end portion in the vehicle cabin, or a display in a meter panel that is provided on a driver's seat side of the instrument panel. Specifically, as the display device 15, a liquid crystal display, an organic electroluminescence (EL), or the like may be used.

The voice output device 16 (an exemplary notification device) is provided in the vehicle cabin of the vehicle 10, and outputs a predetermined sound (for example, a buzzer sound or a beep sound), or a predetermined voice. For example, the voice output device 16 is a buzzer or a speaker.

The air conditioner 17 is known means for conditioning the temperature and humidity in the vehicle cabin of the vehicle 10. For example, the air conditioner 17 includes a refrigeration cycle that is constituted by a compressor (compressing device) to be driven by an engine or an electric motor, a condenser, an evaporator (evaporating device), a gas-liquid separator and the like, a heater core that uses heat of coolant passing through the engine, electric heat or the like, a temperature control mechanism that controls temperature by mixing air passing through the evaporator and air passing through the heat core, and an outlet switching mechanism that switches an outlet of air to the interior of the vehicle cabin. Further, the air conditioner 17 includes a defogger function (also referred to as a defroster function) for at least one of the front window and the rear window.

The fog lamp 18 is an auxiliary lighting device for increasing the visual conspicuousness of the vehicle 10 at the time of low visibility. The fog lamp 18 includes at least one of a front fog lamp and a rear fog lamp. In the addition to the function to increase the visual conspicuousness of the vehicle 10, the front fog lamp has a function to secure forward vision.

As shown in FIG. 3, for example, the ECU 11 includes an information sending unit 111 and a vehicle control unit 112, as functional units that are realized when the CPU 11C executes one or more programs stored in the auxiliary storage device 11A.

For example, the information sending unit 111 acquires the above-described vehicle relevant information, or causes the DCM 13 to acquire the vehicle relevant information, in a predetermined cycle (for example, one minute), and then, sends the vehicle relevant information to the center server 20 through the DCM 13. Specifically, the information sending unit 111 may send, to the center server 20, a signal including identification information (for example, a vehicle index number (VIN) of the vehicle 10, or a vehicle identifier (ID) previously decided for each of the plurality of vehicles 10) for specifying the vehicle 10 that is a sender (hereinafter, referred to as "vehicle identification information"), information relevant to the date and hour of acquisition of the vehicle relevant information (for example, time stamp) (hereinafter, referred to as "acquisition date-and-hour information"), and the vehicle relevant information. Thereby, the center server 20 can identify (specify) the vehicle 10 that is the sender, and can specify the date and hour (acquisition timing) of the acquisition of the vehicle relevant information, and the like.

The function of the information sending unit 111 may be transferred to the DCM 13.

The vehicle relevant information as the sending object by the information sending unit 111 includes image information about the periphery of the vehicle 10 by the camera 14, or information (hereinafter, referred to as "image recognition rate information") relevant to an image recognition rate in image recognition for recognizing a predetermined physical object (for example, a vehicle, a human, a building or a traffic sign) from the image information, as the visibility state relevant information about the vehicle 10, and includes the positional information about the vehicle 10, and the like. In the case where the vehicle relevant information as the sending object includes the above-described image recognition rate information, the ECU 11 of the vehicle 10 may execute an image recognition process, for example, based on a model after a machine learning for recognizing a predetermined kind of physical object from the image information, and may calculate the image recognition rate. On this occasion, in addition to the CPU 11C, the ECU 11 may include an image-processing computation device (for example, a graphical processing unit (GPU), a field programmable gate array (FPGA), an application specific integrated circuit (ASIC)) for performing a high-speed computation by parallel processing in cooperation with the CPU 11C. Further, the ECU 11 may perform the image recognition process, in cooperation with another computer (for example, an ECU) that is mounted on the vehicle 10 and that includes an image-processing computation device. The same goes for the calculation of the image recognition rate in the center server 20, as described later.

The vehicle control unit 112 performs controls relevant to the vehicle 10, in response to control commands from the center server 20. Details will be described later.

Configuration of Center Server

Functions of the center server 20 may be realized by arbitrary hardware or combinations of hardware and software. As shown in FIG. 2B, for example, the center server 20 includes a drive device 21, an auxiliary storage device 22, a memory device 23, a CPU 24, an interface device 25, a display device 26, and an input device 27, which are connected with each other by a bus B2.

For example, programs for realizing various functions of the center server 20 are provided by a portable recording medium 21A such as a compact disc read only memory (CD-ROM), a digital versatile disc read only memory (DVD-ROM) or a universal serial bus (USB) memory. When the recording medium 21A in which the programs are recorded are set in the drive device 21, the programs are installed in the auxiliary storage device 22 from the recording medium 21A through the drive device 21. Further, the programs may be downloaded from another computer through the communication network, and may be installed in the auxiliary storage device 22.

The auxiliary storage device 22 contains the installed various programs, and contains necessary files, necessary data and the like.

When the memory device 23 receives an activation instruction for a program, the memory device 23 reads the program from the auxiliary storage device 22 and contains the program.

The CPU 24 executes the various programs stored in the memory device 23, and realizes various functions about the center server 20 in accordance with the programs.

The interface device 25 is used as an interface for connection with a communication network (for example, the communication network NW).

For example, the display device 26 displays a graphical user interface (GUI) in accordance with programs that are executed by the CPU 24.

The input device 27 is used when an operator, an administrator or the like of the center server 20 inputs various operation instructions relevant to the center server 20.

As shown in FIG. 3, for example, the center server 20 includes an information acquisition unit 201, a computation unit 203, a statistical object selection unit 204, a visibility state estimation unit 205, a vehicle extraction unit 206, and a control information output unit 207, as functional units that are realized when the CPU 24 executes one or more programs stored in the auxiliary storage device 22. Further, the center server 20 uses a vehicle relevant information storage unit 202 and the like. For example, the vehicle relevant information storage unit 202 can be realized using the auxiliary storage device 22 or an external storage device or the like that is communicably connected with the center server 20.

The information acquisition unit 201 acquires the vehicle relevant information received from each vehicle 10, and stores (accumulates) the vehicle relevant information in the vehicle relevant information storage unit 202. Specifically, the information acquisition unit 201 stores the vehicle relevant information received from the vehicle 10, in the vehicle relevant information storage unit 202, as a record associated with the vehicle identification information and acquisition date-and-hour information corresponding to the vehicle relevant information.

In the vehicle relevant information storage unit 202, as described above, the vehicle relevant information received from the vehicle 10 is stored. Specifically, the vehicle relevant information storage unit 202 may hold a record group (that is, a database) of the vehicle relevant information acquired by the plurality of vehicles 10, by holding records including the vehicle identification information, the acquisition date-and-hour information and the vehicle relevant information. The vehicle relevant information storage unit 202 may be provided with a vehicle relevant information storage unit dedicated for each of the plurality of vehicles 10, and may hold a history of records including the acquisition date-and-hour information and the vehicle relevant information for each of the vehicle 10, that is, a record group, in the vehicle relevant information storage unit.

The computation unit 203 calculates a numerical value (hereinafter, referred to as a "visibility state value") indicating the visibility state of the periphery of the vehicle 10, from the visibility state relevant information about the periphery of the vehicle 10. For example, the computation unit 203 calculates the visibility state value corresponding to the visibility state of the periphery of the vehicle 10, for all of the plurality of vehicles 10.

For example, in the case where the vehicle relevant information as the sending object includes the image information about the periphery of the vehicle 10 by the camera 14, the computation unit 203, for each of the plurality of vehicles 10, calculates the image recognition rate as the visibility state value indicating the visibility state, based on the image information that is about the periphery of the vehicle 10, that is stored in the vehicle relevant information storage unit 202 and that is the visibility state relevant information recently received by the center server 20. The image recognition rate can be calculated by the same method as the method for the calculation by the vehicle 10.

In a configuration in which the image recognition rate information is sent from the vehicle 10, the computation unit 203 can be excluded. That is, the function of the computation unit 203 in this example may be transferred to the vehicle 10, and the image recognition rate information including the image recognition rate as the visibility state value may be sent directly from the vehicle 10 to the center server 20, as described above.

From the plurality of vehicles 10, the statistical object selection unit 204 selects vehicles 10 for which the visibility state estimation unit 205 performs a statistical process. In other words, the statistical object selection unit 204 may select vehicles 10 for which the visibility state estimation unit 205 performs a statistical process, by eliminating (filtering) vehicles 10 unsuitable as the object of the statistical process, from the plurality of vehicles 10. Specifically, from the plurality of vehicles 10, the statistical object selection unit 204 selects vehicles 10 that are in a predetermined vehicle state adapted for the object of the statistical process at the time when the vehicles 10 acquires the vehicle relevant information including the visibility state relevant information to be used for the estimation of the visibility state.

For example, from the plurality of vehicles 10, the statistical object selection unit 204 may eliminate vehicles 10 corresponding to the image information in which the image recognition rate is beyond a predetermined normal range, from the object of the statistical process. That is, from the plurality of vehicles 10, the statistical object selection unit 204 may select vehicles 10 corresponding to the image information in which the image recognition rate is within the predetermined normal range, as the object of the statistical process. On this occasion, for example, the normal range may be previously decided as a relatively high range that makes it possible to eliminate very low image recognition rates corresponding to the image information in which the periphery of the vehicle 10 cannot be viewed or is hardly viewed due to frost, dew (including fog) or the like on the front window of the vehicle 10. Further, for example, when the vehicle relevant information including the visibility state relevant information for estimating the visibility state is acquired for each of the plurality of areas, the normal range may be dynamically decided (calculated) as a relatively high range that includes the average of the image recognition rates of the vehicles 10 in the area. Thereby, it is possible to eliminate vehicles 10 for which the visibility state of the periphery is not reflected in the image information of the camera 14 due to generation of frost, dew or the like on the front window, from the object of the statistical process.

Also in the case where the camera 14 is attached in the exterior of the vehicle cabin, by the same method as the above-described method, the statistical object selection unit 204 may eliminate vehicles 10 corresponding to the image information in which the image recognition rate is beyond a predetermined normal range, from the object of the statistical process. This is because in the case where the camera 14 is attached in the exterior of the vehicle cabin, attached matter such as raindrop, frost or dew can be generated on the lens of the camera 14, the transparent member for protecting the lens, or the like.

For each of the plurality of areas decided in the above-described estimation object area, the visibility state estimation unit 205 estimates the visibility state in the area, based on the visibility state relevant information acquired by two or more vehicles 10 that is of the plurality of vehicles 10 and that is in the area. Specifically, for each of the plurality of areas, the visibility state estimation unit 205 may estimate a recent (for example, one minute ago) or current visibility state in the area, based on the visibility state relevant information about the periphery acquired by two or more vehicles 10 that are of the plurality of vehicles 10 and that exist in the area and recently received by the center server 20.

Specifically, for each of the plurality of areas, the visibility state estimation unit 205 estimates the visibility state in the area, by performing a statistical process (for example, a process of calculating the average) relevant to visibility state values calculated by the computation unit 203 and corresponding to all of vehicles 10 that exist in the area at the time when the vehicle relevant information recently received is acquired (hereinafter, referred to as merely "vehicles 10 existing in the area"). That is, the visibility state estimation unit 205 calculates an estimation value (hereinafter, referred to as a "visibility state estimation value") of the visibility state value of the area. Further, for each of the plurality of areas, the visibility state estimation unit 205 may calculate the visibility state estimation value of the area, by performing a statistical process relevant to visibility state values calculated by the computation unit 203 and corresponding to vehicles 10 that are selected by the statistical object selection unit 204 from the vehicles 10 existing in the area. Further, in the case where the number of vehicles 10 as the object of the statistical process is a predetermined number (for example, 5) or less in a certain area, the visibility state estimation unit 205 may determines that the estimation of the visibility of the area is impossible. This is because the accuracy of the estimation of the visibility state can decrease when the number of vehicles 10 as the object of the statistical process is relatively small.

For example, the visibility state estimation unit 205 calculates the average (hereinafter, referred to as an "average image recognition rate") of the image recognition rate, among the vehicles 10 as the object, as the visibility state estimation value. Thereby, the visibility state estimation unit 205 can estimate the visibility state, that is, the degree of the visibility, depending on the level of the average image recognition rate. For example, the visibility state is higher as the average image recognition rate is higher, the visibility state is lower as the average image recognition rate is lower, and the area is in a low visibility state when the average image recognition rate decreases to equal to or lower than a predetermined threshold. Specifically, based on the calculated average image recognition rate, for each of the plurality of areas, the visibility state estimation unit 205 may estimate the visibility state, such that the visibility state is classified into one of ranks (hereinafter, referred to as "visibility state ranks") indicating the degree of the visibility in a plurality of previously arranged grades (for example, ten grades). On this occasion, in the plurality of visibility state ranks, one or more of ranks from the rank with the lowest visibility may be previously decided as visibility state ranks corresponding to the low visibility.

For each of the plurality of areas, the visibility state estimation unit 205 may predict a future visibility state, based on other weather information, for example, based on information relevant to wind speed and wind direction.

The information relevant to the visibility state for each of the plurality of areas estimated by the visibility state estimation unit 205 may be used for controls relevant to the air conditioner 17 and the fog lamp 18, as described later.

For example, the information may be provided to an external device or the like relevant to a weather information company or the like, and may be used for meteorological analysis.

The vehicle extraction unit 206 (an exemplary determination unit) extracts a vehicle 10 (hereinafter, referred to as a "particular vehicle") in which a predetermined attached matter such as dew or frost can exist on the front window (an exemplary transparent member), from the plurality of vehicles 10, based on the visibility state for each of the plurality of areas estimated by the visibility state estimation unit 205.

For example, FIG. 4 is a flowchart schematically showing an exemplary process by which the vehicle extraction unit 206 extracts the particular vehicle. The process of the flowchart is repeatedly performed in a predetermined processing cycle, while the center server 20 is working. On this occasion, for example, the processing cycle may be the same as the longer one of a processing cycle in which the visibility state estimation unit 205 estimates the visibility state and an acquisition cycle in which the center server 20 acquires the visibility state relevant information (the image information about the periphery of the vehicle 10 or the corresponding image recognition rate information) from the plurality of vehicles 10.

In step S102, the vehicle extraction unit 206 extracts areas (hereinafter, referred to as a "high-visibility area") in which the visibility state recently estimated by the visibility state estimation unit 205 is relatively high, from the plurality of areas, and proceeds to step S104. On this occasion, for example, the high-visibility area may be an area corresponding to one or more of previously decided visibility state ranks from a rank that is of the plurality of visibility state ranks described above and that has the highest visibility.

In step S104, the vehicle extraction unit 206 extracts vehicles 10 existing in the high-visibility area, based on the recently acquired vehicle relevant information about the plurality of vehicles 10, and proceeds to step S106.

In step S106, from the vehicles 10 extracted in step S104, the vehicle extraction unit 206 extracts a vehicle 10 corresponding to the image information that is about the periphery of the vehicle 10, that is picked up by the camera 14 and in which the image recognition rate is relatively low (specifically, equal to or lower than a predetermined threshold), as the particular vehicle, and ends this process. In other words, for each of the vehicles 10 extracted in step S104, the vehicle extraction unit 206 determines whether the image recognition rate relevant to the image information (exemplary first image information) that is about the periphery of the vehicle 10 and that is picked up by the camera 14 (an exemplary first pickup device) of the vehicle 10 is above a predetermined standard, the predetermined standard being lower than the image recognition rate corresponding to the visibility state rank of an area with a relatively high visibility state estimated based on the image information that is information of cameras 14 corresponding to two or more vehicles 10 and that includes the image information (exemplary second image information) about the peripheries of other vehicles 10 picked up by cameras 14 (second pickup devices) of the other vehicles 10, and extracts a vehicle 10 corresponding to the determination, as the particular vehicle. The reason is as follows. In the case where the vehicle 10 is in the high-visibility area, the image recognition rate relevant to the image information that is about the periphery of the vehicle 10 and that is picked up by the camera 14 of the vehicle 10 is ordinarily relatively high. However, in a state where the image recognition rate is relatively low, it can be determined that the state of the periphery of the vehicle 10 is not reflected in the image information.

The control information output unit 207 outputs control information relevant to the vehicle 10. The control information is information for deciding a control manner relevant to the vehicle 10.

For example, the control information output unit 207 sends control information relevant to the fog lamp 18, to the vehicle 10 in an area (hereinafter, referred to as a "low-visibility area") that is of the plurality of areas and for which it is determined that the visibility is low based on the visibility state for each area estimated by the visibility state estimation unit 205. Specifically, the control information output unit 207 may send control information for requesting to light the fog lamp 18, to the vehicle 10. In this case, based on the control information received from the center server 20, the vehicle control unit 112 of the vehicle 10 automatically lights the fog lamp 18, if the fog lamp 18 is in an unlighted state. Thereby, even when a driver of the vehicle 10 forgets to light the fog lamp 18 in the state of the low visibility, it is possible to automatically light the fog lamp 18, in response to the control information from the center server 20. Further, the control information output unit 207 may send, to the vehicle 10, control information for requesting to give a notice urging the occupant (driver) of the vehicle 10 to light the fog lamp 18, through the display device 15 or the voice output device 16 of the vehicle 10. In this case, in response to the control information received from the center server 20, the vehicle control unit 112 of the vehicle 10 controls the display device 15 or the voice output device 16, and gives a notice urging the occupant of the vehicle 10 to perform a lighting operation of the fog lamp 18, if the fog lamp 18 is in an unlighted state. Thereby, even when the driver of the vehicle 10 forgets to light the fog lamp 18 in the state of the low visibility, it is possible to urge the driver to perform the lighting operation of the fog lamp 18, based on the control information from the center server 20.

Further, for example, the control information output unit 207 sends control information relevant to the air conditioner 17, to the vehicle 10 (particular vehicle) extracted by the vehicle extraction unit 206. Specifically, to the particular vehicle, the control information output unit 207 may send control information for requesting the air conditioner 17 to perform a predetermined action such as an actuation start (ON) of the air conditioner 17 or an actuation (ON) of the defogger function of the air conditioner 17. In this case, the vehicle control unit 112 of the vehicle 10 that is the particular vehicle performs a control relevant to the air conditioner 17, in response to the control information received from the center server 20. Thereby, even when dew, frost or the like is generated on the front window or the like of the vehicle 10, the ECU 11 of the vehicle 10 automatically starts the actuation of the air conditioner 17, or initiatively uses the defogger function, so that it is possible to remove the dew, the frost or the like. Further, the control information output unit 207 may send, to the particular vehicle, control information for requesting to give a notice urging the occupant (driver or passenger) of the particular vehicle to perform an operation for causing the air conditioner 17 to perform the above-described predetermined action, through the display device 15 or the voice output device 16 of the particular vehicle. In this case, in response to the control information received from the center server 20, the vehicle control unit 112 of the vehicle 10 controls the display device 15 or the voice output device 16, and gives a notice urging the occupant of the vehicle 10 to remove the dew or the frost by performing a manual operation for causing the air conditioner 17 to perform the predetermined action. Thereby, even when the dew, the frost or the like is generated on the front window or the like of the vehicle 10, the ECU 11 of the vehicle 10 can urge the occupant of the vehicle 10 to perform a manual operation relevant to the air conditioner 17 for removing the dew or the fog, as exemplified by the actuation start of the air conditioner 17 and the execution of the defogger function.

In the case where the camera 14 is attached in the exterior of the vehicle cabin, to the particular vehicle, the control information output unit 207 may send control information for giving, to the occupant of the particular vehicle, a notice indicating that the attached matter such as water drop, frost or dirt is on the transparent member such as the lens of the camera 14 in the exterior of the vehicle cabin or a transparent plate for protecting the camera 14, or a notice urging the removal of the attached matter on the transparent member, through the display device 15 or the voice output device 16. In this case, in response to the control information received from the center server 20, the vehicle control unit 112 of the vehicle 10 controls the display device 15 or the voice output device 16 of the vehicle 10, and gives, to the occupant of the vehicle 10, the notice indicating that the attached matter such as water drop, frost or dirt is on the transparent member such as the lens of the camera 14 or the transparent plate for protecting the camera 14, or the notice urging the removal of the attached matter. Thereby, even when the attached matter such as water drop, frost or dirt is on the transparent member such as the lens of the camera 14 in the exterior of the vehicle cabin or the transparent plate for protecting the camera 14, the ECU 11 of the vehicle 10 can cause the occupant of the vehicle 10 to recognize the existence of the attached matter, or can urge the occupant of the vehicle 10 to remove the attached matter. Further, in the case where a device (hereinafter, referred to as a "removal device") that removes the attached matter on the transparent member such as the transparent plate for protecting the lens of the camera 14 and the camera 14 (for example, a device that injects washer fluid or a wiper device that wipes the surface of the transparent member) is mounted on the vehicle 10, the control information output unit 207 may send, to the particular vehicle, control information for causing the removal device to perform a predetermined action for removing the attached matter. In this case, in response to the control information received from the center server 20, the vehicle control unit 112 of the vehicle 10 performs a control relevant to the removal device. Thereby, even when the attached matter is generated on the lens of the camera 14 in the exterior of the vehicle cabin, the transparent plate for protection, or the like, it is possible to remove the attached matter by an automatic operation of the removal device.

Operation of Embodiment

Next, the operation of the visibility state estimation system 1 (center server 20) according to the embodiment will be described.

In the embodiment, the vehicle extraction unit 206 determines whether the predetermined attached matter is on the transparent member, based on the image information (first image information) that is about the periphery of the vehicle 10 and that picked up through the predetermined transparent member by the camera 14 mounted on the vehicle 10 and other information that is relevant to the visibility state of the periphery of the vehicle 10 and that is different from the first image information.

Thereby, the center server 20 can use not only the first image information that is about the periphery of the vehicle 10 and that is acquired on the targeted vehicle 10 but also the other information relevant to the visibility state of the periphery of the vehicle 10. Therefore, even when it is not possible to recognize the physical object in the periphery of the vehicle 10 from the first image information of the vehicle 10 due to the attached matter (for example, dew or frost) on the transparent member (for example, the window of the vehicle 10, the lens of the camera 14, or the transparent plate for protecting the camera 14), so that the first image information corresponds to a state where the visibility is relatively low, it is possible to determine that the attached matter is on the transparent member, if the other information indicates that the visibility is relatively high. Accordingly, the center server 20 can distinguish between a state where the visibility of the periphery of the vehicle 10 is relatively low and a state where the attached matter is on the transparent member such as the window of the vehicle 10.

In the embodiment, the vehicle extraction unit 206 may determine that the predetermined attached matter is on the transparent member, when the degree of the visibility of the periphery of the vehicle 10 that is indicated by the first image information is above a predetermined standard, the predetermined standard being lower than the degree of the visibility of the periphery of the vehicle 10 that is indicated by the other information.

Thereby, the center server 20 can grasp whether the degree of the visibility corresponding to the first image information reflects an actual visibility state, using the degree of the visibility corresponding to the other information as a standard. Accordingly, the center server 20, specifically, can distinguish between the state where the visibility of the periphery of the vehicle 10 is relatively low and the state where the attached matter is on the transparent member such as the window of the vehicle 10.

In the embodiment, the other information may be image information (second image information) that is about the periphery of another vehicle 10 surrounding the vehicle 10 and that is picked up by the camera 14 mounted on the other vehicle 10.

Thereby, the center server 20 can use the second image information that is picked up on another vehicle surrounding the vehicle 10 (for example, another vehicle in a 500-meter square area containing the geographical position of the vehicle 10). Therefore, for example, in the case where the first image information corresponding to the vehicle 10 indicates a relatively low visibility state and where the second image information indicates a relatively high visibility state, the center server 20 can determine that the attached matter such as dew is on the transparent member such as the window of the vehicle 10. Accordingly, the center server 20 can distinguish between the state where the visibility of the periphery of the vehicle 10 is relatively low and the state where the attached matter is on the transparent member such as the window of the vehicle 10.

For example, the center server 20 may use information that is relevant to the visibility state and that is provided from an outside weather information company, as the other information, instead of the second image information about the periphery of the other vehicle 10 (specifically, the information that is relevant to the visibility state in an area containing the other vehicle 10 and that is estimated based on the image information corresponding to a plurality of vehicles in the area).

In the embodiment, the vehicle extraction unit 206 may determine that the predetermined attached matter is on the transparent member, when the image recognition rate relevant to the first image information is above a predetermined standard, the predetermined standard being lower than the image recognition rate relevant to the second image information.

Thereby, the center server 20, specifically, can distinguish between the state where the visibility of the periphery of the vehicle is relatively low and the state where the attached matter is on the transparent member of the vehicle, based on comparison in the image recognition rate for recognition of a predetermined physical object between the first image information and the second image information.

Instead of the image recognition rate, the center server 20 may use, for example, the maximum of the distance from the vehicle 10 (camera 14) to the predetermined physical object that is recognized in the image information, as a criterion indicating the degree of the visibility.

In the embodiment, the vehicle extraction unit 206 may determine whether the predetermined attached matter is on the transparent member, based on the first image information and the information that is relevant to the visibility state in a predetermined area containing the geographical position of the vehicle 10 and that is estimated from the second image information corresponding to each of a plurality of other vehicles 10 in the predetermined area.

Thereby, for example, although there is a possibility that the visibility state of the periphery is not reflected in the second image information about one of other vehicles 10 similarly to the case of the first image information, the center server 20 can use the information that is relevant to the visibility state and that is estimated from the second image information corresponding to the plurality of other vehicles. Thereby, in the information relevant to the visibility state, influence of some second image information not reflecting the visibility state of the periphery is removed, or averaging is performed, so that a higher accurate estimation result for the visibility state is provided. Accordingly, the center server 20 can more accurately distinguish between the state where the visibility of the periphery of the vehicle 10 is relatively low and the state where the attached matter may exist on the window or the like of the vehicle 10.

The center server 20 does not need to estimate the visibility state for each of the plurality of areas. That is, the center server 20 does not need to use the information relevant to the visibility state estimated for each of the plurality of areas. For example, from the plurality of vehicles 10, the center server 20 extracts a vehicle 10 corresponding to the image information that is about the periphery of the vehicle 10, that is picked up by the camera 14 and in which the image recognition rate is relatively low. Then, the center server 20 may determine that the predetermined attached matter exists on the transparent member such as the window of the vehicle 10, when the image recognition rate relevant to the image information (first image information) corresponding to the extracted vehicle 10 is above a predetermined standard, the predetermined standard being lower than the image recognition rate relevant to the second image information corresponding to each of one or more of other vehicles 10 in the periphery of the vehicle 10 (for example, is above a predetermined amount lower than the average of the image recognition rate relevant to the second image information corresponding to each of one or more of other vehicles 10).

In the embodiment, when the vehicle extraction unit 206 determines that dew or frost as the predetermined attached matter is on the window, the control information output unit 207 may output at least one of the control information for giving a notice urging the occupant of the vehicle 10 to perform the operation for causing the air conditioner 17 of the vehicle 10 to perform the predetermined action through the notification device (for example, the display device 15 or the voice output device 16) of the vehicle 10 and the control information for causing the air conditioner 17 to perform the predetermined action.

Thereby, when the center server 20 determines that dew, frost or the like is on the window, the center server 20, specifically, can urge the occupant of the vehicle 10 to perform the manual operation of the air conditioner 17 of the vehicle 10 for removing the dew, the frost or the like on the window, through the notification device of the vehicle 10. Further, when the center server 20 determines that dew, frost or the like is on the window, the center server 20, specifically, can automatically remove the dew, the frost or the like on the window, by controlling the air conditioner of the vehicle 10, for example, by executing the defogger function of the air conditioner.

The embodiment of the disclosure has been described in detail above.

The disclosure is not limited to the particular embodiment, and various modifications and improvements can be performed within the scope of the spirit of the disclosure described in the claims.

For example, in the above-described embodiment, the function of the control information output unit 207 of the center server 20 may be transferred to each vehicle 10 (for example, the ECU 11 (an exemplary vehicle control device)). In this case, the center server 20 sends, to the vehicle 10, the information that is relevant to the visibility state of the area containing the position of the vehicle 10 and that is estimated by the visibility state estimation unit 205, and the information relevant to whether the vehicle is the particular vehicle that is extracted by the vehicle extraction unit 206. Thereby, for example, the ECU 11 of the vehicle 10 can realize the function of the control information output unit 207, based on the information that is relevant to the visibility state of the area containing the position of the own vehicle and that is received from the center server 20 and the information relevant to whether the own vehicle is the particular vehicle.

In the above-described embodiment and modification, instead of the center server 20, each vehicle 10 (for example, the ECU 11 (an exemplary determination device)) may estimate the visibility state, and may determine whether the own vehicle is the particular vehicle. That is, the functions of the visibility state estimation unit 205 and vehicle extraction unit 206 of the center server 20 may be transferred to each of the plurality of vehicles 10. For example, the ECU 11 of the vehicle 10 acquires the visibility state relevant information (for example, the image information of the camera 14) about the periphery that is acquired by a vehicle 10 in an area that is of the plurality of areas and that contains the position of the own vehicle, that is, by another vehicle 10 surrounding the own vehicle, or the visibility state value (for example, the image recognition rate relevant to the pickup image of the camera 14) calculated from the periphery state relevant information about the periphery. On this occasion, the vehicle 10 may acquire the visibility state relevant information or the visibility state value from the other vehicle 10 through the center server 20, or may acquire the visibility state relevant information or the visibility state value from the other vehicle 10, for example, through inter-vehicle communication. Then, based on the acquired information or numerical value, the ECU 11 of the vehicle 10 may determine whether the own vehicle is the particular vehicle, by the same method as the above-described method.

What is claimed is:

1. A determination device, comprising:
   circuitry configured to:
   first, extract a high-visibility area from a plurality of areas, the high-visibility area having a visibility state estimated to be higher than another area of the plurality of areas;
   second, determine whether a vehicle exists in the high-visibility area;
   third, only when the vehicle is determined to exist in the high-visibility area, determine that a predetermined attached matter is on a transparent member of the vehicle when an image recognition rate of first image information about a periphery of the vehicle is equal to or lower than a predetermined threshold; and
   send control information to the vehicle, the control information causing the vehicle to take action in response to determining that the predetermined attached matter is on the transparent member of the vehicle, wherein
   the first image information is picked up through the transparent member by a first pickup device that is mounted on the vehicle,
   the predetermined threshold hold is determined based upon second image information about a periphery of another vehicle that exists in the high-visibility area picked up by a second pickup device that is mounted on the other vehicle,
   vehicles that are in a predetermined vehicle state adapted for being an object of a statistical process are selected,
   the vehicles that are in the predetermined vehicle state adapted for being the object of the statistical process are vehicles corresponding to image information in which an image recognition rate is within a predetermined normal range, and
   the visibility state in the high-visibility area is estimated from the second image information corresponding to each of the selected vehicles.

2. The determination device according to claim 1, wherein the circuitry is configured to determine that the predetermined attached matter is on the transparent member when a degree of visibility of the periphery of the vehicle that is indicated by the first image information is above a predetermined standard, the predetermined standard being lower than a degree of the visibility of the periphery of the vehicle that is indicated by the second information.

3. The determination device according to claim 1, wherein the circuitry is configured to determine that the predetermined attached matter is on the transparent member, when the image recognition rate of the first image information is above a predetermined standard, the predetermined standard being lower than an image recognition rate of to the second image information corresponding to each of a plurality of other vehicles in the high-visibility area.

4. A system comprising:
   the determination device according to claim 1; and
   a vehicle control device comprising circuitry configured to receive the control information, wherein:
   the transparent member is a window that is provided on the vehicle such that an occupant is able to visually recognize an exterior of a vehicle cabin from an interior of the vehicle cabin, and
   when the determination device determines that dew or frost, as the predetermined attached matter, is on the window, the circuitry of the vehicle control device is configured to at least one of: give a notice urging the occupant of the vehicle to perform an operation for causing an air conditioner of the vehicle to perform a predetermined action through a notification device of the vehicle and cause the air conditioner to perform the predetermined action.

5. The determination device according to claim 1, wherein the circuitry is configured to extract multiple vehicles from the high-visibility area based upon vehicle relevant information acquired from a plurality of vehicles, the multiple vehicles including the vehicle and the plurality of other vehicles.

6. The determination device according to claim 1, wherein the normal range is determined based on an image recognition rate corresponding to image information in which a periphery of a vehicle cannot be viewed or is hardly viewed due to frost or dew.

7. The determination device according to claim 1, wherein, in a case where a number of the selected vehicles is predetermined number or less in a certain area, estimation of the visibility of the certain area is determined to be impossible.

8. The determination device according to claim 1, wherein a future visibility state is predicted for at least one of the plurality of areas based on weather information.

9. A determination method that is executed by a determination device, the determination method comprising:

first, extracting a high-visibility area from a plurality of areas, the high-visibility area having a visibility state estimated to be higher than another area of the plurality of areas;

second, determining whether a vehicle exists in the high-visibility area;

third, only when the vehicle is determined to exist in the high-visibility area, determining that a predetermined attached matter is on a transparent member of the vehicle when an image recognition rate of first image information about a periphery of the vehicle is equal to or lower than a predetermined threshold; and sending control information to the vehicle, the control information causing the vehicle to take action in response to determining that the predetermined attached matter is on the transparent member of the vehicle, wherein the first image information is picked up through the transparent member by a first pickup device that is mounted on the vehicle, the predetermined threshold hold is determined based upon second image information about a periphery of another vehicle that exists in the high-visibility area picked up by a second pickup device that is mounted on the other vehicle, vehicles that are in a predetermined vehicle state adapted for being an object of a statistical process are selected, the vehicles that are in the predetermined vehicle state adapted for being the object of the statistical process are vehicles corresponding to image information in which an image recognition rate is within a predetermined normal range, and the visibility state in the high-visibility area is estimated from the second image information corresponding to each of the selected vehicles.

10. A non-transitory computer readable medium storing a determination program that causes a determination device to execute a method comprising:

first, extracting a high-visibility area from a plurality of areas, the high-visibility area having a visibility state estimated to be higher than another area of the plurality of areas;

second, determining whether a vehicle exists in the high-visibility area;

third, only when the vehicle is determined to exist in the high-visibility area, determining that a predetermined attached matter is on a transparent member of the vehicle when an image recognition rate of first image information about a periphery of the vehicle is equal to or lower than a predetermined threshold; and sending control information to the vehicle, the control information causing the vehicle to take action in response to determining that the predetermined attached matter is on the transparent member of the vehicle, wherein the first image information is picked up through the transparent member by a first pickup device that is mounted on the vehicle, the predetermined threshold hold is determined based upon second image information about a periphery of another vehicle that exists in the high-visibility area picked up by a second pickup device that is mounted on the other vehicle, vehicles that are in a predetermined vehicle state adapted for being an object of a statistical process are selected, the vehicles that are in the predetermined vehicle state adapted for being the object of the statistical process are vehicles corresponding to image information in which an image recognition rate is within a predetermined normal range, and the visibility state in the high-visibility area is estimated from the second image information corresponding to each of the selected vehicles.

* * * * *